United States Patent [19]
Föhl

[11] Patent Number: 6,033,018
[45] Date of Patent: Mar. 7, 2000

[54] VEHICLE SEAT

[75] Inventor: Artur Föhl, Schorndorf, Germany

[73] Assignee: TRW Occupant Restraint Systems GmbH, Alfdorf, Germany

[21] Appl. No.: 08/786,871

[22] Filed: Jan. 23, 1997

[30] Foreign Application Priority Data

Jan. 29, 1996 [DE] Germany ........................ 296 01 479 U

[51] Int. Cl.$^7$ ..................................................... B60N 2/42
[52] U.S. Cl. .............................. 297/216.13; 297/216.12; 297/408; 297/216.14
[58] Field of Search ..................... 297/216.12, 216.13, 297/216.14, 216.1, 408

[56] References Cited

U.S. PATENT DOCUMENTS

| | | | |
|---|---|---|---|
| 2,973,029 | 2/1961 | Schlosstein | 297/216.12 |
| 3,802,737 | 4/1974 | Mertens | 297/216.12 |
| 3,838,870 | 10/1974 | Hug . | |
| 3,866,723 | 2/1975 | Smith | 297/216.1 |
| 4,335,918 | 6/1982 | Cunningham | 297/216.14 |
| 5,181,763 | 1/1993 | Dellanno et al. | 297/408 |
| 5,290,091 | 3/1994 | Dellanno et al. . | |
| 5,378,043 | 1/1995 | Viano et al. | 297/216.12 |

FOREIGN PATENT DOCUMENTS

| | | |
|---|---|---|
| 0627340 | 12/1994 | European Pat. Off. . |
| 4939710 | of 0000 | Japan . |
| 5788455 | of 0000 | Japan . |
| 4925690 | of 1974 | Japan . |
| 4934535 | of 1974 | Japan . |
| 7291005 | 11/1975 | Japan . |
| 1483567 | 8/1977 | United Kingdom . |

*Primary Examiner*—Anthony D. Barfeld
*Attorney, Agent, or Firm*—Tarolli, Sundheim, Covell, Tummino & Szabo

[57] ABSTRACT

A vehicle seat comprises a backrest with a separate backrest part, a headrest integrated in the backrest and a pivot pin horizontally arranged in the backrest. The separate backrest part and the headrest constitute two arms of a two-armed lever pivotally mounted about an axis defined by said pivot pin. The two-armed lever is pivoted about the axis in case of a rear end crash due to an inertia force of a vehicle occupant which is partly taken up by said separate backrest part, in order to move the headrest toward the head of said occupant and to reduce forces acting on the head.

22 Claims, 4 Drawing Sheets

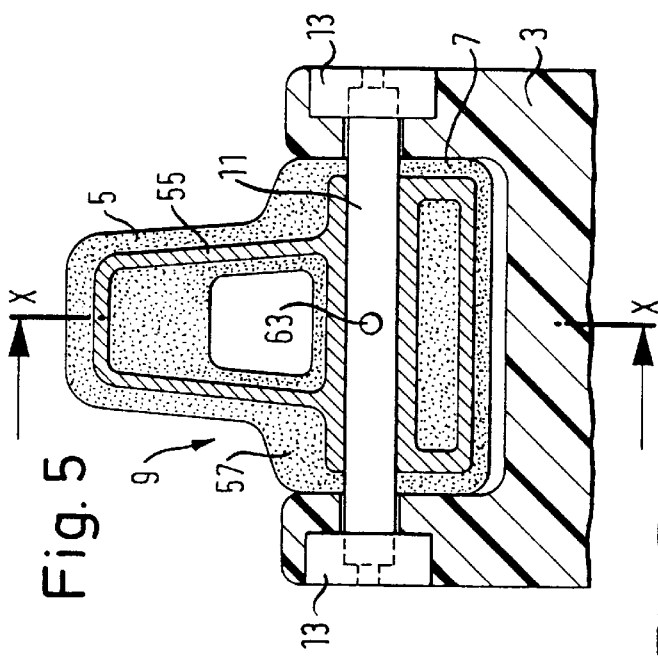
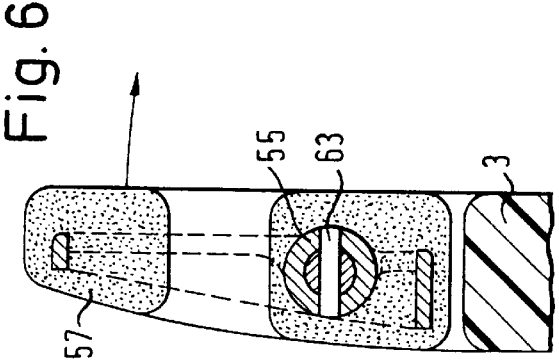
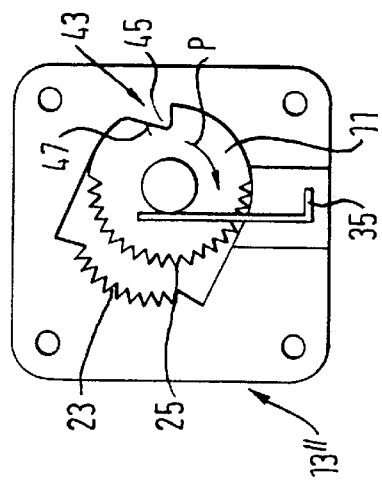
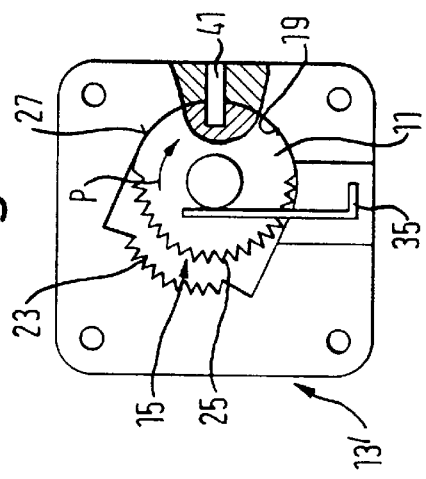
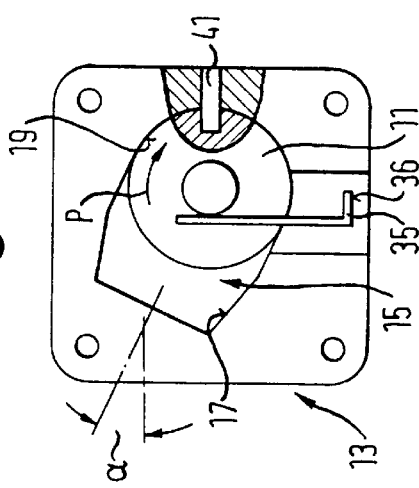

VEHICLE SEAT

TECHNICAL FIELD

The invention relates to a vehicle seat with a headrest integrated in the backrest.

BACKGROUND OF THE INVENTION

One function of a headrest is to prevent the head of a vehicle occupant from being thrown to the rear in relation to the vehicle in a rear end crash. Typically headrests are mounted in a vertically adjustable manner on the seat back. Moreover, there are also headrests which are designed as an extended, fixed part of the seat of the vehicle seat. In the case of the headrests presently employed in vehicles, irrespectively of whether it is a question of an adjustable or a non-adjustable design thereof, the cervical vertebrae of the seat occupant are subjected to substantial strains in a rear end crash because the distance of the occupant's head from the headrest may be comparatively large (up to 150 mm) despite the occupant's back engaging the seat back.

In order to avoid such strains, there has already been a proposal to accommodate a gas bag in the headrest. In an accident, a gas generator fills the gas bag within a matter of milliseconds under the control of a sensor. Since, however, there can be substantial differences in the distance between the occupant's head and the gas bag, a very short distance, for example, between the occupant's head and the headrest may mean that the occupant's head is even caused to bounce off the gas bag, this causing an undesired strain.

Furthermore, equipment has been suggested using energy stored by means of a spring or by means of a pyrotechnic device to cause a support means operated by a suitable triggering device to approach the occupant's head and, on contacting the head, to immediately remain in the respective position thereof. For the control suitable sensors are arranged on the surface of the headrest. Although highly promising results have been obtained in the course of tests such systems have not gone into mass-production due to substantial technical expenditure.

BRIEF SUMMARY OF THE INVENTION

An object of the invention is to provide a vehicle seat which has a headrest and is able to be manufactured at low costs, and which will reduce forces acting on the occupant's head and neck in a rear end crash.

This is achieved by a vehicle seat comprising a backrest with a separate backrest part, a headrest integrated in the backrest and a pivot pin horizontally arranged in the backrest. The separate backrest part and the headrest constitute two arms of a two-armed lever, pivotally mounted about an axis defined by the pivot pin. The two-armed lever is pivoted about the axis in case of a rear end crash due to an inertia force of a vehicle occupant which is partly taken up by the separate backrest part, in order to move the headrest toward the head of the occupant. The vehicle seat according to the present invention is characterized by a particularly simple structure able to be manufactured at low costs. The backrest part is arranged separately from the rest of the backrest for pivotal motion about the axis of a pivot pin. The pivoting backrest part is naturally not recognized as a separate part from the outside, it preferably remains concealed under a seat cover.

The pivoting backrest part can for example be designed in the form of a lumbar region cushion of the body of the seat occupant or, in accordance with a preferred embodiment, a shoulder support formed in the upper backrest region, the pivot pin then being arranged between the headrest and the shoulder support. In the case of this embodiment, neither the occupant's shoulder region engages the shoulder support nor does the occupant's head engage the headrest in the normal position of use, i.e. for normal vehicle operation. In a rear end crash, the upper body of the occupant will move to the rear in relation to the vehicle and the occupant's shoulder region will strike the shoulder support which is situated at only a small distance from it. This leads to a pivotal motion of the two-armed lever formed by the headrest and the backrest part so that the headrest is pivoted toward the head of the vehicle occupant. The distance of his head from the headrest is accordingly substantially reduced or even completely taken up so that the degree of acceleration in the occupant's head and neck portions is reduced, too.

Because the distance between the occupant's head and the headrest are relatively large as compared with the distance of the backrest part from the corresponding body region, it is advantageous, if the lever arm, defined by the force engagement point for a seat occupant of medium height, is substantially longer than the lever arm defined by the force engagement point on the backrest part. The lever arms in this case are related to the respective center engagement points of the forces acting on the headrest and on the backrest part. There is, consequently, a step-up transmission of the movement of the backrest part as a movement of the headrest.

The ratio between the lever arms, which are defined by the engagement of the force on the headrest and the engagement of force on the backrest part preferably bears a reciprocal relationship to the ratio of the body masses of a seat occupant of medium height which act on the headrest and the backrest part.

Another preferred feature of the invention is such that the ratio between the lever arms defined by the force engagement point on the headrest and by the force engagement point on the backrest part is in a range between 2.5:1 and 6:1 or, more especially, in a range between 4:1 and 6:1.

If the lever arm ratio is within the indicated ranges, there will approximately be an equilibrium of forces acting on the two-armed lever, when the occupant's head strikes the headrest and the back of the seat occupant strikes the backrest part in an accident. This is important for the two-armed lever to form a firm support. The equilibrium state on the two-armed lever depends on the masses acting on it at the two lever arms. If, for instance, the shoulder support constitutes the backrest part which is pivotally mounted then an equilibrium state may be achieved when the ratio of the lever arms bears a reciprocal relationship to the mass of the occupant's head and the proportional mass of the occupant's shoulder. Normally this ratio will be 1:4 to 1:6 so that the lever arms will have the above mentioned reciprocal relationship. If the headrest is pivoted forward and if the occupant's head touches it, this will mean there will be no significant relative movements between seat occupant's head and shoulder or head and back part.

Preferably the ratio between the length of the headrest to the length of the backrest part will be in a range between 2.5:1 and 6:1, i.e. it is in the range of the ratio of the lever arms so that it will not be possible for disproportionate lever ratios to result with very tall or very short occupants.

In order to compensate for the inertia of the two-armed lever as well, it is preferred for the pivot pin to run through the center of gravity of the two-armed lever constituted by the headrest and the backrest part with the result that the unit formed is force-neutral in the horizontal direction and, accordingly, also in a rear end crash.

According to a further embodiment of the invention, the bearing supporting the pivot pin is so designed that pivoting of the headrest and of the backrest part is at least opposed in the case of a radial load. Accordingly it is possible to ensure that on impingement of the occupant's head against the headrest the resulting impetus can not cause unimpeded backward yielding rebound of the backrest part. Even a checking or opposing action will reduce the backward yielding rebound. The optimum arrangement is, however, one in which the headrest and the backrest part are locked together once the latter has moved the headrest nearer to the occupant's head.

In order to reduce backward yielding rebound owing to impact of the occupant's head, the bearing possesses means for producing a frictional force and/or means for producing an interlocking connection opposing or preventing pivoting. For this purpose the bearing may be so designed that at a predetermined radial load the means for producing the frictional force and/or the means for producing an interlocking connection are able to be shifted by the movement (relative to the pivot pin) due to the inertia force exerted by the seat occupant, out of a non-actuated position into an actuated one. This means that the checking or locking action is automatically activated.

In order to exclude the possibility of opposing or locking occurring during normal driving of the vehicle due to a radial load, for example on getting into the vehicle or during acceleration, a biasing device is provided which sets the non-actuated position so that a radial load must be built up first in order to shift the means into the actuated position.

The means for producing a frictional force preferably have a tapering receiving opening into which the pivot pin is thrust in the actuated position into engagement with the outer wall surface of the receiving opening. Accordingly, there is a wedging action so that pivoting is opposed by increased frictional force, such force even being so high that there is a self-locking action which means that no further pivoting is possible.

Preferably the bearing of the pivot pin has a bearing opening with a cylindrical section and a non-cylindrical section, the pivot pin only coming into contact with the non-cylindrical section under a radial load and the non-cylindrical section comprising at least partly the means for producing the frictional force and/or producing the interlocking connection.

The means for producing frictional force may be provided outside the bearing or, in accordance with a preferred embodiment, in the bearing itself. In this respect, the bearing opening may have a well with a continuously tapering cross section into which the pivot pin passes in the actuated position. This means that the bearing opening has a section permitting a pivoting movement and an adjoining section in the form of a well, into which the pivot pin can be thrust and may be jammed and held therein.

An easily produced feature of the invention is such that the bearing opening comprises a cylindrical section and a non-cylindrical, toothed section in a well and the pivot pin has a section with an outline complementary to the toothed section, and, furthermore, a cylindrical section. When a rear end crash occurs, the corresponding sections come into engagement with one another and prevent pivoting of the headrest. In order to ensure that the headrest is stably held in a normal position of use, holding means are provided which must be overridden by pressure on the backrest part due to inertial forces in a rear end crash. Such holding means may for example comprise at least one shear pin or a ratchet-like connection adapted not to lock in one direction of pivoting and to lock in the opposite direction, in the latter case the ratchet-like connection preferably comprising a sawtooth-like projection on the bearing side, which, in the position of use, fits into a complementary recess in the pivot pin.

It is also possible for the holding means to comprise a return spring to urge the headrest into the position of use and against an abutment.

Furthermore, a damper may be provided which damps the pivotal movement of the headrest. This is something which is more particularly advantageous, if there is a certain distance between the occupant and the shoulder support so that a respective jolt is generated when the occupant's shoulder part strikes the shoulder support, such jolt is also severely reduced by the damper.

The invention will now be explained with reference to the accompanying drawings.

BRIEF DESCRIPTION OF THE DRAWINGS

FIG. 5 shows a longitudinal section taken through the upper part of the vehicle seat headrest;

FIG. 6 is a sectional view taken on the line X—X of FIG. 5;

FIG. 7 is a side elevation of a bearing of the headrest in accordance with a first embodiment;

FIG. 8 is a side elevation of the bearing of the headrest in accordance with a second embodiment;

FIG. 9 is a side elevation of the bearing of the headrest in accordance with a third embodiment;

DETAILED DESCRIPTION OF THE INVENTION

Figure 1:
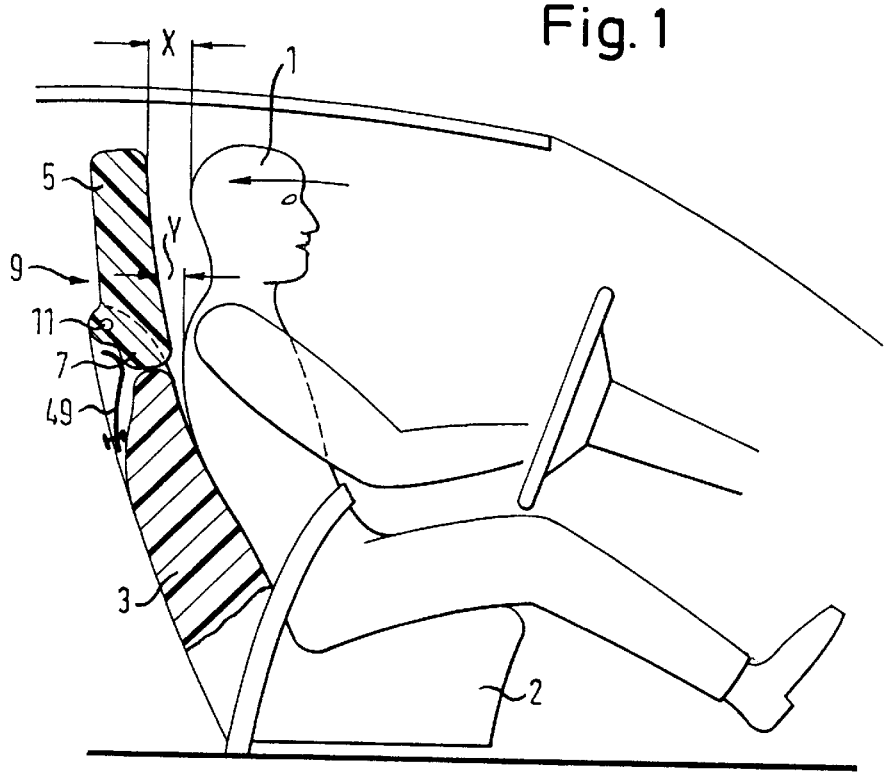
FIG. 1 shows a simplified drawing to show the principle of the vehicle seat of the invention in a partly sectioned view in the position of use.
Figure 4:
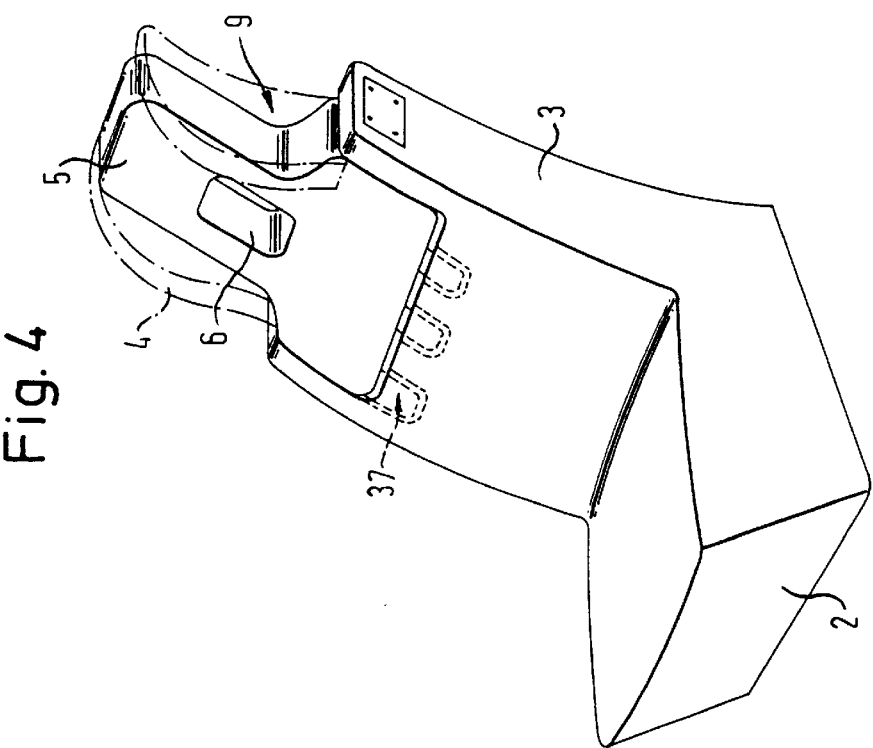
FIG. 4 shows the vehicle seat of FIG. 1 in a perspective view looking obliquely from the front.
Figure 10:
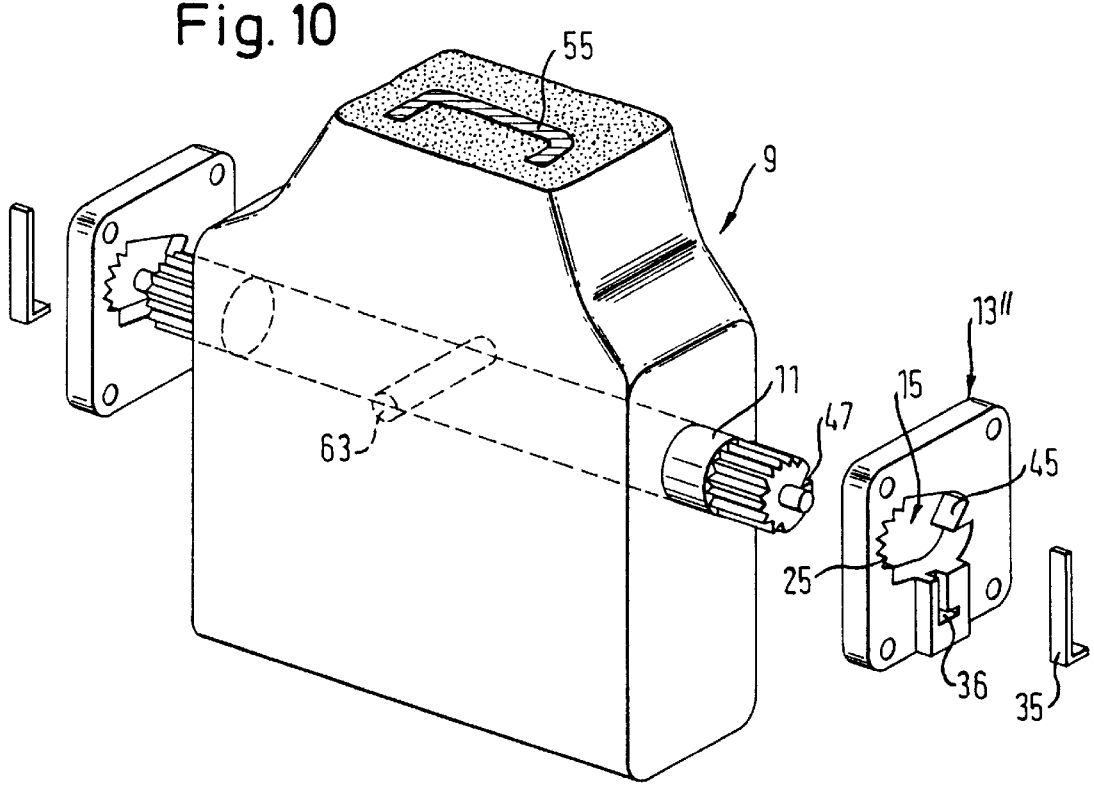
FIG. 10 is an exploded view of the headrest and backrest part of the bearing in accordance with FIG. 9.

In FIG. 1, vehicle seat 2 for a vehicle occupant 1 is to be seen in the normal position of use, i.e. in the travelling position. The vehicle seat 2 comprises a backrest part 3 with a headrest 5, which is connected with a pivot pin 11 which, as is to be more clearly seen in FIG. 5, is pivotally mounted in a top terminal portion of the backrest by means of two bearings 13 for pivoting movement. A part (termed the backrest part 7 in what follows) which is separate from the rest of the backrest 3 has an upper backrest part forming a shoulder support. The headrest 5 and the separate backrest part 7 are cushioned to be harder than the remaining backrest 3 so that direct force transmission and rapid setting of the headrest is rendered possible as will be described hereinafter. The backrest part 7 is made integrally with the headrest 5 and the pivot pin 11 is arranged between the headrest 5 and the shoulder support so that a two-armed lever 9 is formed by the headrest 5 and the shoulder support. The two-armed lever 9 is able to be pivoted about the axis of the pivot pin 11. In the normal position of use depicted in FIG. 1, the headrest is at a distance X from the head of the occupant 1, such distance being approximately equal to the distance occurring with vehicle seats so far in use. The shoulder of the occupant 1 is at a smaller distance Y from the backrest part 7. The masses of the two-armed lever 9 and the position of the pivot pin 11 are so matched to one another that the pivot pin 11 extends through the center of gravity of the lever 9. In order for a transitional zone 37 between the backrest part 7 and the remaining backrest 3 not to be hollow, the cushion parts, are provided with teeth in this region, so as to interlock with each other as shown in FIG. 4 in broken lines. Furthermore, the headrest 5 may, as also shown in FIG. 4 in broken lines, have laterally projecting beads 4 and can be provided with an aperture 6 as is also illustrated in FIG. 4.

In order for the pivot lever 9 to remain stably in the normal position of use, there is, in accordance with FIG. 1, provided a return spring 49 in the form of a strip spring pressing on the rear side of the backrest part 7 and urging the backrest part 7 against a lateral stop member. Furthermore, in accordance with FIG. 2 a damper 71 is arranged on the rear side of the backrest part 7 in order to act during pivoting of the lever 9.

As shown in FIG. 5 the two-armed lever 9 is made up of several layers and comprises a robust skeleton 55 having a transverse hole through which the pivot pin 11 extends. A pin 63 connects the skeleton 55 with the pivot pin 11 in a manner to prevent relative rotation. The skeleton 55 is surrounded by a cushion 57, preferably produced by foaming around it. As shown in FIG. 6, the skeleton 55 is partly in the form of stiffening ribs in order to reduce weight.

FIGS. 7 through 9 show various different possible forms of bearings for the pivot pin 11. In principle it is possible for example for one side of the backrest 3 to have a rotary bearing and for the other side to accordingly have a bearing 13, 13' and 13" as shown in FIGS. 7 through 9, in which respect, however, it is an advantage if both sides have the same bearing design. In FIGS. 7 through 9, the position of the pivot pin 11 within the bearing 13, 13' and 13" is illustrated in the normal position of use. The bearing 13 in accordance with FIG. 7 has a bearing opening 15 with a front cylindrical section 19 and an adjoining well 17, tapering with a small taper or wedge angle so that the pivot pin 11 may be jammed or gripped in the well 17. The center line of the well 17 in this case extends upwardly at an angle α to the horizontal. A shear pin 41 extends through the bearing 13 and fits into the pivot pin 11 preventing same from rotating. The free ends of the pivot pin 11 each possess an extension with a smaller diameter, against which a respective biasing device in the form of a spring 35—here a flat spring—urges. In the bearing 13, the spring 35 fits into a suitable groove 36 and is crimped in place therein, it serving to hold the pivot pin 11, which in the design of FIG. 5 is completely cylindrical, in the cylindrical section 19 of the bearing opening 15 so that a non-actuated setting is defined.

With respect to its shear pin 41 and the spring 35 the bearing 13' depicted in FIG. 8 is the same as the bearing 13 illustrated in FIG. 7. The bearing opening 15 here also has a cylindrical section 19 which is adjoined by a well, said well, however, having a toothed section 23. The pivot pin 11 does not have any completely cylindrical circumferential surface, as is illustrated in FIG. 7, and instead simply has a cylindrical section 27 which is adjoined by a section 25 with a toothed outline representing a complementary outline for cooperation with the teeth of section 23.

The bearing 13" illustrated in FIG. 9 is generally the same as the bearing 13' depicted in FIG. 8, there being a ratchet-like connection 43 instead of the shear pin 41, such connection 43 having a saw-tooth projection 45 on the bearing side fitting into a pit 47 in the pivot pin 11 which is formed complementary to it. The projection 45 and the pit 47 are so designed that the pivot pin 11 is able to be pivoted in a direction P whereas it is locked in the opposite direction.

With reference to the Figures the injury-reducing effect of the vehicle seat 2 in a rear end crash will now be explained. During normal driving operation the vehicle seat 2 will be in the position of use depicted in FIG. 1, holding means in the form of the return spring 49, the shear pin 41 or the ratchet-like connection 43, serving to restrain the lever 9 on pivoting in the position of use. Furthermore, the spring 35 cooperates to hold the lever 9 in the position of use.

In a rear end crash, the occupant 1 will be moved to the rear due to his inertia, the small distance Y meaning that firstly the occupant's shoulder parts come into contact with the backrest part 7. The impetus resulting from this causes rotation of the two-armed lever 9 in the direction P, as is to be seen in FIG. 2, so that the headrest 5 is shifted forward. The head of the occupant will finally strike the headrest 5, which is arranged only at a small distance from the head, so that loading of the occupant's neck region is reduced.

Figure 2:
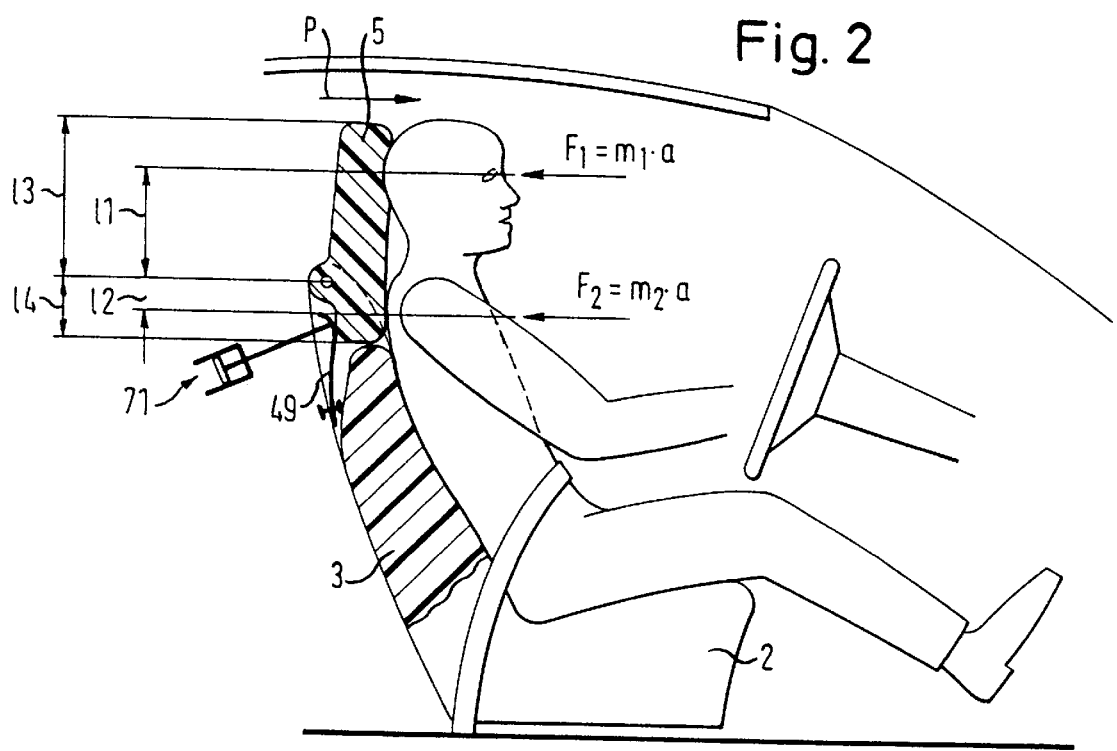
FIG. 2 shows the vehicle seat of FIG. 1 in a rear end crash.
Figure 3:
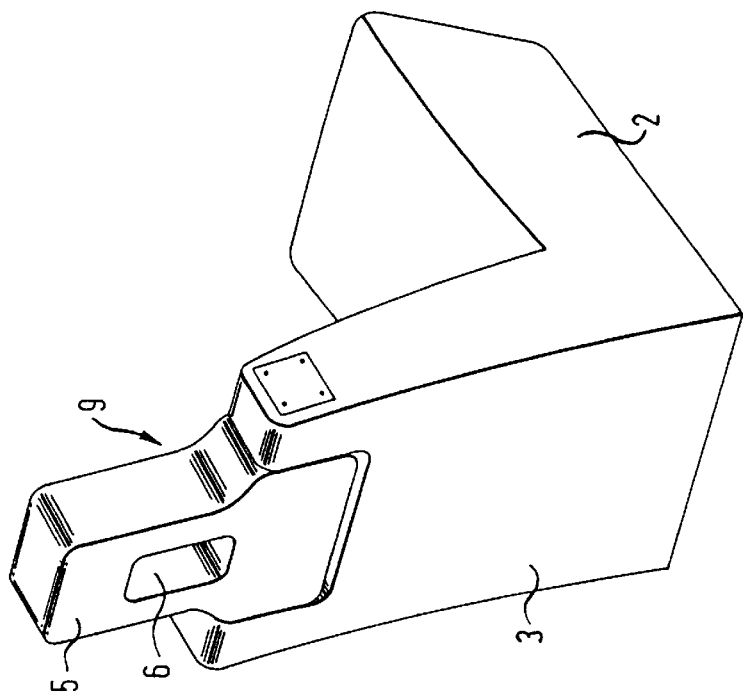
FIG. 3 shows the vehicle seat of FIG. 1 in a perspective view looking obliquely from the rear.
Figure 11:
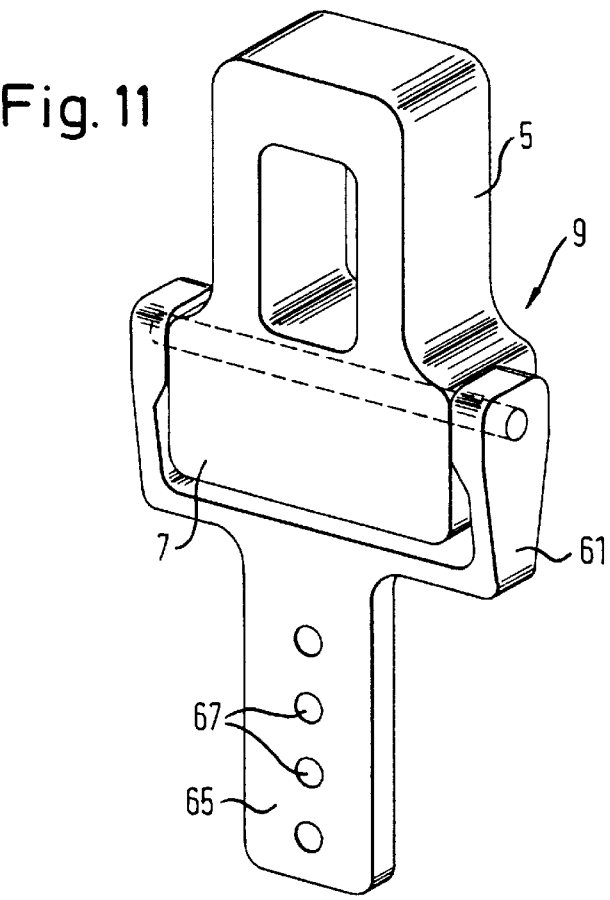
FIG. 11 shows a headrest together with the backrest part mounted on a U-like shaped, vertically adjustable support.

Since the occupant's head and the shoulder parts have different masses acting on the lever 9 there may be a lack of equilibrium at the lever 9 which means that the headrest 5 is unstable and relative motion may occur. In order to prevent this, an equilibrium at the lever 9 is aimed. This is achieved by designing the lever arms 11 and 12 at the headrest 5 and, respectively, at the backrest part 7 (which are defined by the respective force engagement point for the head mass and, respectively, the shoulder mass), so that the ratio of the lever arms is reciprocally proportional to the ratio of the body masses acting on such parts. In this respect, an occupant of medium height is selected for reference. As shown in FIG. 2, due to the amounts of inertia and to the lever arms 11 and 12 there is an equilibrium of forces at lever 9. In order to provide effective protection for extremely short or extremely tall occupants 1, the ratio 11:12 of lever arms 11 and 12 is in a range of 2.5:1 to 6:1 and preferably in a range between 4:1 and 6:1, since the ratio between the mass of the occupant's head and the proportional part of the occupant's shoulders is in a range of 1:4 and 1:6 for most people. The ratio of the length 13 of the headrest 5 to the length 14 of the backrest part is preferably in a range between 2.5:1 and 6:1. Whether equilibrium occurs at the lever 9 depends, however, more particularly on the position of the pivot pin 11. By vertically adjusting the position of the pivot pin 11 the lever arms 11 and 12 can be adapted to the respective user. In FIG. 11, the headrest 5 is for this purpose borne in a U-like carrier 61, which possesses a tongue 65 with a plurality of equally spaced holes 67, the tongue 65 being received in a corresponding bearing in the backrest 3, a releasable ratchet pawl device (not illustrated) fitting into the individual holes 67 for adjustment of the height of the headrest 5 and accordingly of the entire lever 9. Since there can be no absolute equilibrium of forces in an accident when headrest is not correctly adjusted and the masses will in part take effect on the lever 9 with a delay in time, means are provided to fix the position of the headrest 5 as soon as it has been pivoted toward the vehicle user's head. These means only act when there is a collision under radial loading and cause pivoting of the headrest 5 and of the backrest part 7 to be at least opposed and preferably completely prevented. FIG. 7 shows a means for this purpose for producing a frictional force constituted by the well 17. When there is an accident, the pivot pin 11 will pivot in the direction P and the shear pin 41 will be shorn off. Owing to the radial forces which act on the backrest part 7 and which are present when the occupant's head contacts the support 5, the pivot pin 11 will be displaced downward against the force of the spring 35 and will fit into the tapering well 17 where it will be clamped or where at least turning thereof will be impeded due to an increased friction. If a self-locking action occurs, relative motion between the occupant's head and shoulders are even impossible.

In the design of FIG. 8, the toothed section 23 and the section 25 constitute a means for producing an interlocking connection to exclude any possibility of pivoting of the lever 9 in the actuated position of the means. If there is a rear end crash the pivot pin 11 will be shifted to the rear in relation to the vehicle after the pivot pin has turned while supported in its cylindrical section 27 so that the teeth in section 25 will mesh with the cooperating teeth on the section 23 of the bearing 13'. In this actuated position, lever 9 will be in a locked state. In the embodiments illustrated in FIGS. 7 and 8 it is necessary for a new shear pin 41 to be fitted after shifting of the pivot pin 11 to the rear whereas, on the other hand, the bearing 13" in accordance with FIG. 9 allows manually resetting the pivot pin 11 in its original position after a minor accident. The projection 45 is namely not shorn off on rotation in the direction P.

Other means may also be employed for producing the interlocking connection. For instance the pivot pin 11 does not have to be splined or toothed for half of its periphery as illustrated in FIG. 8 since it would be sufficient to have only a few teeth on the periphery.

In order to prevent heavy impact of the headrest against the user's head, the headrest 5 can be suitably softly cushioned. The return spring 49 can serve, in this case, like an additional damping means to reduce impact just like the separate damper 71. Additionally it is possible by having a higher moment of friction at the pivot pin 11 to produce the same effect, this being done by having a larger diameter of the extensions of the pivot pin 11 into which the springs 35 fit.

I claim:

1. A vehicle seat for helping to protect an occupant of said vehicle seat in a rear impact collision, said vehicle seat comprising:
   a backrest with a separate backrest part;
   a headrest integrated in said backrest;
   a pivot pin extending horizontally in said backrest for pivotally attaching said headrest to said backrest,
   said separate backrest part and said headrest constituting two arms of a two-armed lever pivotally mounted about an axis,
   said two-armed lever being mounted to said backrest such that said two-armed lever is pivotable about said axis to move said headrest in a forward direction toward a head of the occupant of said vehicle seat upon a force acting on said backrest part due to a rear impact collision; and
   a bearing for supporting rotation of said pivot pin, said bearing having means for producing an interlocking connection so that, in case of a radial loading above a predetermined radial load, pivoting of said headrest is prevented.

2. The vehicle seat as claimed in claim 1 wherein said separate backrest part comprises a shoulder support formed in an upper portion of said backrest, said pivot pin being arranged between said headrest and said shoulder support.

3. The vehicle seat as claimed in claim 1 wherein said pivot pin extends through a center of gravity of said two-armed lever.

4. The vehicle seat as claimed in claim 1 wherein said means for producing an interlocking connection is shiftable from a non-actuated position to an actuated position at a radial load exceeding said predetermined radial load by movement of said pivot pin relative to said axis in a rear impact collision.

5. The vehicle seat as claimed in claim 4 further comprising a biasing device for placing said means for producing an interlocking connection in said non-actuated position when the radial load is less than said predetermined radial load.

6. The vehicle seat as claimed in claim 1 wherein said bearing has a bearing opening with a circular cylindrical section and a non-circular cylindrical section, said pivot pin coming into contact with said non-circular cylindrical section under a radial load exceeding said predetermined radial load, said non-circular cylindrical section comprising a portion of said means for producing an interlocking connection.

7. The vehicle seat as claimed in claim 6 wherein said non-circular cylindrical section of said bearing opening comprises a well having a toothed section, said pivot pin having a circular cylindrical section and a section with an outline complementary to said toothed section and said seat further comprising holding means for holding said headrest in a normal position of use.

8. The vehicle seat as claimed in claim 1 further comprising holding means for holding said headrest in a normal position of use, said normal position of use being overridden by pressure on said separate backrest in a rear impact collision.

9. The vehicle seat as claimed in claim 8 wherein said holding means comprises at least one shear pin.

10. The vehicle seat as claimed in claim 8 wherein said holding means comprises a ratchet-like connection pivotable in a first direction and lockable in a second direction opposite said first direction.

11. The vehicle seat as claimed in claim 10 wherein said ratchet-like connection comprises a saw-tooth-like projection on a side of said bearing and a complementary recess in said pivot pin into which said projection fits.

12. The vehicle seat as claimed in claim 8 wherein said holding means comprises a return spring urging said headrest against a stop member.

13. The vehicle seat as claimed in claim 1 further including a damper for damping pivoting movement of said headrest.

14. The vehicle seat as claimed in claim 1 wherein said bearing includes a bearing opening having a well with a continuously tapering cross section defining said means for producing an interlocking connection, said pivot pin moving into said well in an actuated condition.

15. A vehicle seat for helping to protect an occupant of said vehicle seat in a rear impact collision, said vehicle seat comprising:
   a backrest with a separate backrest part;
   a headrest integrated in said backrest; and
   a pivot pin extending horizontally in said backrest for pivotally attaching said headrest to said backrest,
   said separate backrest part and said headrest constituting two arms of a two-armed lever pivotally mounted about an axis,
   said two-armed lever being mounted to said backrest such that said two-armed lever is pivotable about said axis to move the headrest in a forward direction toward a head of the occupant of said vehicle seat upon a force acting on said backrest part due to a rear impact collision; and a bearing for supporting rotation of said pivot pin, said bearing having means for producing an interlocking connection so that, in case of a radial loading above a predetermined radial loading, pivoting of said headrest is prevented, said bearing having a bearing opening with a circular cylindrical section and a non-circular cylindrical section, said pivot pin coming into contact with said non-circular cylindrical section under a radial load exceeding said predetermined radial load, said non-circular cylindrical section comprising a portion of said means for producing an interlocking connection, said non-circular cylindrical section of said bearing opening comprising a well having a toothed section, said pivot pin having a circular cylindrical section and a section with an outline complementary to said toothed section.

16. The vehicle seat as claimed in claim 15 further comprising holding means for holding said headrest in a normal position of use, said normal position of use being overridden by pressure on said separate backrest in a rear impact collision.

17. The vehicle seat as claimed in claim 16 wherein said holding means comprises at least one shear pin.

18. The vehicle seat as claimed in claim 16 wherein said holding means comprises a ratchet-like connection pivotable in one direction and lockable in an opposite direction.

19. The vehicle seat as claimed in claim 16 wherein said holding means comprises a return spring urging said headrest against a stop member.

20. The vehicle seat as claimed in claim 15 further comprising a biasing device for placing said means for producing an interlocking connection in a non-actuated position absent a radial load.

21. A vehicle seat for helping to protect an occupant of said vehicle seat in a rear impact collision, said vehicle seat comprising:

a backrest with a separate backrest part;

a headrest integrated in said backrest; and a pivot pin extending horizontally in said backrest for pivotally attaching said headrest to said backrest, said separate backrest part and said headrest constituting two arms of a two-armed lever pivotally mounted about an axis, said two-armed lever being mounted to said backrest such that said two-armed lever is pivotable about said axis to move said headrest in a forward direction toward a head of an occupant of said vehicle seat upon a force acting on said backrest part due to a rear impact collision, said pivot pin extending through a center of gravity of said two-armed lever so that in a rear impact collision the inertia masses of said two arms of said two-armed lever compensate each other to minimize pivotal movement caused by said force on said backrest part.

22. A vehicle seat for helping to protect an occupant of said vehicle seat in a rear impact-collision, said vehicle seat comprising:

a backrest with a separate backrest part;

a headrest integrated in said backrest;

a pivot pin extending horizontally in said backrest for pivotally attaching said headrest to said backrest, said separate backrest part and said headrest constituting two arms of a two-armed lever pivotally mounted about an axis, said two-armed lever being mounted to said backrest such that said two-armed lever is pivotable about said axis to move said headrest in a forward direction toward a head of the occupant of said vehicle seat upon a force acting on said backrest part due to a rear impact collision; and a bearing for supporting rotation of said pivot pin, said bearing having means for producing an interlocking connection so that, in case of a radial loading above a predetermined radial load, pivoting of said headrest in said forward direction and in an opposing backward direction is prevented.

* * * * *